United States Patent Office 3,706,603
Patented Dec. 19, 1972

3,706,603
METAL COATINGS COMPRISING HEXAVALENT CHROMIUM, TRIVALENT CHROMIUM, SILICA OR A SILICATE AND AN ALKALI METAL CATION
Clifford A. Vessey, Harrogate, Colin Albon, Knaresborough, and Kenneth Holker, Harrogate, England, assignors to Albright & Wilson Limited, Oldbury, near Birmingham, England
No Drawing. Continuation-in-part of abandoned application Ser. No. 731,714, May 24, 1968. This application Apr. 12, 1971, Ser. No. 133,409
Claims priority, application Great Britain, June 14, 1967, 27,489/67; Nov. 27, 1967, 53,816/67
Int. Cl. C23f 7/26, 11/04; H01b 3/02
U.S. Cl. 148—6.2                            18 Claims

ABSTRACT OF THE DISCLOSURE

The invention provides an aqueous composition for providing metals with electrical and/or corrosion resistance having a pH of 2.0 to 4.0 and dissolved or uniformly dispersed therein: (a) a hexavalent chromium compound; (b) a trivalent chromium compound; (c) a soluble or insoluble colloidally dispersable silica and/or silicate in a total amount of at least 0.5 grams per 100 ml. of the composition; and (d) an alkali metal cation, the weight ratio of hexavalent chromium to total chromium (each determined on a $CrO_3$ basis) being between 0.5:1 and 0.75:1, the total chromium content being at least 0.5 g. chromium (calculated as $CrO_3$) per 100 ml. of the composition, and the weight ratio of hexavalent chromium (calculated as $CrO_3$) to alkali metal (calculated as the hydroxide) being between 5:1 and 100:1, the said aqueous composition being free from reducing agents for hexalent chromium. The invention also provides a method for preparing cured coatings on metal by applying said aqueous composition to a metal surface and curing thereon.

---

This application is a continuation of application Ser. No. 731,714, filed May 24, 1968 which became abandoned after the filing of Ser. No. 133,409.

This invention relates to improvements to metal coatings, particularly coatings which provide corrosion resistance to the metal which may then be painted; and also to coatings which are electrically insulative even after high temperature annealing such that the coated metal may be useful in electrical apparatus, for example as an electrical steel.

Whilst chromate type coatings on metal surfaces have been used to confer corrosion resistance and paint adhesion properties for many years, the coatings have suffered from the disadvantage that on heating for relatively short periods at temperatures as low as 100° C., many of the desirable properties of the coating are lost. This is of particular importance where a metal which has been chromate coated is subsequently painted on only a part of the surface and the paint cured by heating, under which conditions the corrosion resistance of the remainder of the surface is greatly impaired. It is an objective of the present invention to provide chromate type coatings on metal which do not lose their desirable properties on heating at temperatures such as those encountered in the curing of organic stoving finishes.

Coating compositions of the type disclosed in this application can be used, when applied at a sufficient thickness, to impart electrical resistance to the coated surfaces. It is current practice to use compositions containing phosphoric acid and/or phosphate for the production of electrically insulating coatings on steel. However, changes in the manufacturing methods used in the fabrication of components, such as laminated cores, are demanding coatings which will withstand annealing in a non-oxidising atmosphere at temperatures as high as 800° C. A hydrogen atmosphere is normally used for the annealing operation and the conventional phosphate based coatings are not satisfactory after such an annealing stage. We have found that compositions of the present invention will give coatings which retain their electrical insulating properties and adhesion after such an annealing stage and thus satisfy the stringent requirements of heat resistance, etc. which the newer manufacturing techniques necessitate.

We have now found that an improved coating may be provided on a metal surface, especially on ferrous metal, by using an aqueous solution comprising a partially reduced chromic acid (sometimes termed a "chromic chromate" solution), silica or a silicate dissolved or dispersed therein and containing a specified amount of an alkali-metal cation. We have found that such solutions which do not contain the specified amount of alkali-metal cation give coatings which do not remain adherent to the metal surface if this is subjected to a heat treatment. A coating provided by such solution imparts to the metal a high degree of corrosion resistance and paint applied thereto is satisfactorily adherent. The coating also has a high electrical insulation which permits the use of the treated metal in laminated components of electrical apparatus, such as transformers. Such electrically-insulative coated metal may also have a greatly increased resistance against deterioration upon being subjected to a high temperature treatment in an inert or reducing atmosphere which permits the treated metal to be used in components of electrical apparatus that are necessarily subjected to such high temperature treatment, e.g., annealing at about 800° C. in a hydrogen atmosphere, during manufacture.

Accordingly, from one aspect the invention provides an aqueous composition for providing metals with electrical and/or corrosion resistance having a pH not greater than 4.0 and comprising dissolved or uniformly dispersed therein: (a) a hexavalent chromium compound (b) a trivalent chromium compound; (c) silica and/or a silicate in a total amount of at least 0.5 gram per 100 ml. of the composition; and (d) an alkali-metal cation, the weight ratio of hexavalent chromium to total chromium (each determined on a $CrO_3$ basis) being between 0.5:1 and 0.75:1, the total chromium content being at least 0.5 g. chromium (calculated as $CrO_3$) per 100 ml. of the composition, and the weight ratio of hexavalent chromium (calculated as $CrO_3$) to alkali metal (calculated as the hydroxide) being between 5:1 and 100:1.

From a second aspect, the invention provides a method for the coating of metal surfaces, wherein a metal surface is treated with a composition of the invention to provide a coating thereon and thereafter the coating is cured to render its hexavalent chromium content substantially water-insoluble.

From a third aspect, the invention provides metals with coated surfaces whenever produced by a method, or by using a composition, of the invention.

From a fourth aspect, the invention provides an electrical apparatus comprising a laminated component consisting of a stack or coil of coated metal according to the third aspect of the invention.

The compositions of the invention are normally prepared by the partial reduction of an aqueous solution of chromic acid. The chromic acid solution may also be partially neutralised, that is it may be formed in part from a water-soluble chromate or dichromate salt, such as sodium or potassium dichromates. Nevertheless the aqueous solution is strongly acid and should have a pH of less than 2.0, preferably less than 1.5 before reduction. The solution contains at least 0.5 g. of $CrO_3$ per 100 ml.

and normally such solution will contain 10 to 50 g./100 ml.

An appropriate quantity of a reducing agent is then added and, if necessary, the solution heated, to effect the partial reduction of chromic acid to the trivalent state, that is the solution contains both a hexavalent and a trivalent chromium compound, though the two compounds may be intercombined as chromic chromate. The degree of reduction is conveniently expressed as a ratio of hexavalent chromium remaining in the solution to the total chromium content of the solution, each calculated on a $CrO_3$ basis, that is the ratio of $CrO_3$ to total chromium calculated as $CrO_3$. This ratio is at least 0.5:1, but to avoid unnecessarily long curing periods it is preferred that the ratio should not exceed 0.75:1. At ratios of about 0.50:1 there is a tendency for precipitation to occur in the solution; but, when a corrosion-resistant coating is to be applied and the treated surface is subsequently painted, this ratio is optimumly as low as possible consistent with avoidance of precipitation in order to achieve maximum paint adhesion. In such cases the ratio is usually 0.55–0.63:1. When an electrically-insulative coating is applied which is subsequently to be subjected to high temperature annealing, the ratio is desirably 0.60–0.70:1 and for such purposes the optimum ratio appears to be from 0.67:1 to 0.69:1. After reduction the solution should have a pH of between 1.5 and 4.0, preferably between 2.0 and 3.0.

The reducing agent employed is one that is capable of effecting the reduction of chromium from the hexavalent to the trivalent state and should be one which does not leave deleterious by-products in the solution. For this reason sulphur-containing reducing agents are desirably avoided in order that the corrosion resistance of the coated metal should not be adversely affected. Organic reducing agents are preferred since the by-products are often innocuous or are removable from the solution on heating. Particularly preferred are sugars such as dextrose, glucose and sucrose; reducing starches; alcohols such as methanol; ethanol, ethylene glycol, polyethylene glycol, glycerol, mannitol, sorbitol; alkylolamines such as triethanolamine; and hydroquinone. Inorganic reducing agents can also be employed; for example hydroxylamine (preferably not as the sulphate salt) or phosphorous acid may be employed. The reducing agent is normally added in the amount calculated to obtain the desired ratio of hexavalent to total chromium and the solution will often require to be heated to boiling to complete the reduction process.

The compositions of the invention also comprises silica or a silicate. This component may be added before or after the formation of the chromic chromate, but preferably it is added after the partial reduction of the chromic acid. The silica or silicate must be one capable of dissolving in the chromic chromate solution or becoming dispersed therein to form a homogeneous, that is colloidal, dispersion. It is therefore preferably used in a finely-divided form. The use of fume or precipitated silica, is preferred, especially the form of fume silica sold under the trademark Aerosil, but naturally-occurring ground quartz and diatomaceous earth may also be used when the necessary dispersion can be obtained. There may also be used silicates such as montmorillonite or synthetic flurosilicates, such as complex magnesium fluorosilicates sold under the trade name Laponite. The use of soluble sodium or potassium silicates and fluorosilicates is much less preferred since they tend to form glassy coatings with poor adhesion and therefore the use of a water-insoluble silica or silicate that is nevertheless colloidally dispersible in the chromic chromate solution is preferred. Mixtures of different forms of silica and/or different silicates may be used if desired.

The silica or silicate is present in the compositions of the invention in a total amount of at least 0.5 gram, preferably 0.5 to 10 grams, per 100 ml. of the composition.

For use in providing an electrically-insulative coating an amount of from 2 to 4% on this basis is preferred with a total chromium content (calculated as $CrO_3$) of from 20 to 30 g./100 ml. However, where only corrosion resistance is required, the reduced hexavalent chromium composition may be diluted with water before addition of the silica or silicate to reduce the total chromium concentration (calculated as $CrO_3$) usually to within the range of 3 to 10 grams per 100 ml. of the composition. The silica or silicate is then added in the aforesaid quantities based on the total volume of solution after such dilution. If silica or silicate is added before dilution of the solution it may be present in a total amount up to 20 grams per 100 ml. of composition. However, this composition will normally be unduly concentrated for convenient application and will be diluted as aforesaid. The optimum amount of silica or silicate for the provision of corrosion resistance without the electrically-insulative properties is thus from 2 to 4% by weight based on the total volume of the composition with total chromium content of 3–10 grams of Cr (as $CrO_3$) per 100 ml.

The composition requires the presence of an alkali-metal cation to improve the adhesion of the coating to the metal surface and more particularly the high temperature resistance of such coating. Preferably, such cation is added by adjusting the pH of the composition by the addition of an alkali-metal base after the partial reduction of the hexavalent chromium. For this purpose it is preferred to use potassium hydroxide or potassium carbonate, but sodium hydroxide, sodium carbonate or soda ash may also be used. The ratio of hexavalent chromium ($CrO_3$) in the composition to the alkali-metal (calculated as its hydroxide) should lie between 5:1 and 100:1. It is convenient to add the base in such amount that the pH of the composition is adjusted to a value of at least 2.0, though not greater than 4.0. A final pH value of 2.5 to 3.5 appears to be the optimum. The alkali-metal cation can also be provided by the appropriate use of sodium or potassium chromate or dichromate in the preparation of the composition.

The compositions of the invention include an aqueous composition for providing metals with corrosion resistance having a pH of 2.0 to 4.0 and dissolved or uniformly dispersed therein:

(a) a hexavalent chromium compound;
(b) a trivalent chromium compound;
(c) silica and/or a silicate in a total amount of 0.5–10 grams per 100 ml. of the composition; and
(d) an alkali-metal cation, the weight ratio of hexavalent chromium to total chromium (each determined on a $CrO_3$ basis) being between 0.55:1 and 0.63:1, the total chromium content being at least 0.5 g. chromium (calculated as $CrO_3$) per 100 ml. of the composition, and the weight ratio of hexavalent chromium (calculated as $CrO_3$) to alkali metal (calculated as hydroxide) being between 5:1 and 100:1.

The compositions of the invention also include an aqueous composition for providing metals with electrical resistance having a pH of 2.0 to 4.0 and dissolved or uniformly dispersed therein:

(a) a hexavalent chromium compound;
(b) a trivalent chromium compound;
(c) silica and/or a silicate in a total amount of 0.5–10 grams per 100 ml. of the composition; and
(d) an alkali metal cation, the weight ratio of hexavalent chromium to total chromium (each determined on a $CrO_3$ basis) being between 0.60:1 and 0.70:1, the total chromium content being 10–50 grams of chromium (calculated as $CrO_3$) per 100 ml. of the composition, and the weight ratio of hexavalent chromium (calculated as $CrO_3$) to alkali metal (calculated as hydroxide) being between 5:1 and 100.1.

In the method of the invention, the compositions of the invention, obtained as hereinbefore described, are applied as a coating to a metal surface in any convenient manner, for example by brushing, dipping or spraying; preferably a roller coating method of application is employed. The metal so coated is then usually subjected to a heat curing operation, preferably immediately after the coating has taken place. This curing is preferably carried out as quickly as possible by heating to a suitable temperature, but when diluted compositions are employed to obtain solely corrosion resistance air drying alone may be satisfactory. The purpose of the curing is to dry the liquid film applied to the metal surface and to convert the chromium in the coating into a form in which it is substantially water-insoluble, that is it is not substantially lost on leaching. However if the curing step is unduly prolonged the resulting coating has a greater tendency to contain leachable hexavalent chromium and accordingly the preferred conditions of cure for coatings on steel for use in electrical appliances are those which result in a coating containing substantially no water-soluble hexavalent chromium. In such cases the curing temperature will usually be from 250–500° C. but, when only corrosion resistance is being provided and a solution of lower chromium content is being used, the temperature may be lower, for example between 150 and 250° C. The period of cure should be shorter at higher curing temperatures and vice versa and we have found that satisfactory results are obtained with a cure of about 0.5 minute at 500° C., or of from 1 to 3 minutes between 250° C. and 400° C. when electrical resistance is primarily required and from 20 secs. to 1 minute between 150 and 250° C. when corrosion resistance is primarily required.

The metal treated is preferably a ferrous metal, usually steel and for most effective use of the electrical-insulative properties of the cured coating, the base metal is preferably a silicon steel containing up to 5% silicon. However, corrodible non-ferrous metals, for instance, aluminium, magnesium, zinc and their alloys can also usefully be coated by the method of the invention and thus this method can advantageously be applied to galvanized iron or steel.

The resulting cured coating has marked anti-corrosion properties which enable the treated metal to find use in many widely differing applications. Paint or lacquer adhesion to the coated metal is good and the invention finds particular use in the treatment of both sides of a metal surface followed by painting one of the sides. In this way the invention can provide a chromate coating on the inside of metal containers, the outsides of which are painted or lacquered to provide even greater corrosion resistance. The treated metal can also have a plastic coating applied thereto, for example by electrostatic powder coating, by dip coating or by an extrusion technique to produce such articles as plastic-coated wire mesh. Another virtue of coated metals treated according to the invention is that in cases where the entire metal object has been subjected to the chromate treatment it is possible to apply a paint or lacquer to part of the object and to cure the paint or lacquer by stoving, and yet still retain the corrosion resistance of the unpainted or unlacquered part of the object. Further, after this treatment the unpainted part of the object is still an excellent substrate for subsequent painting. These effects have hitherto not been satisfactorily obtained with a chromate anti-corrosion painting. Yet a further virtue of the coated metals obtained according to the invention is that the electrical resistance of the coating is maintained after heating in an inert or reducing atmosphere; for instance the coatings may often be subjected to temperatures above 500° C., for example at 800° C., in such an atmosphere for several hours without marked deterioration. This enables such coated metal, particularly coated silicon steel, to be subjected to an annealing treatment, often carried out in an atmosphere of hydrogen.

The metal coatings also have valuable electrical insulative properties which enable the coated metal to be made up into laminates, either by coiling a coated metal strip and, if desired, then cutting it, or by forming a stack of individual coated sheets. Such laminated products find use as components in electrical apparatus, for example in the cores of transformers. The present metal coatings have a high degree of adhesion and inter-lamination electrical resistance, particularly when applied to steel, especially silicon steel. Moreover, the coatings have a high space factor; that is they do not occupy too much space in the total volume of laminate. Coated steel according to the invention is termed an electrical steel and the coating is conveniently applied to steel strip which is recoiled after the application of the coating and its cure. The coils may then be sent to transformer manufacturers who carry out on them the fabrication of transformer cores which may involve the annealing of the metal by a heat treatment at 800–1200° C. in a hydrogen atmosphere. Silicon steel that has been treated with a composition of the invention as hereinbefore described is particularly suited for this purpose.

The invention is illustrated by the following examples:

EXAMPLE 1

A hot solution of chromic acid (44.8 kg. of $CrO_3$) in water (150 litres) was reduced by the addition of wheat starch (3.87 kg. as a slurry in 30 litres of water) followed by boiling for 30 minutes. Analysis showed the resulting solution to have a pH of 1.9 and a ratio of soluble $CrO_3$ to total $CrO_3$ of 0.68:1. After cooling, finely divided silica (6.83 kg.) was added slowly with vigorous stirring followed by potassium hydroxide (approximately 4.25 litres of a 50% w./w. solution) to raise the pH of the final solution to 2.55. Application of this solution to the surface of a silicon steel strip at a wet film thickness of $1.15 \times 10^{-2}$ mm. produced, after stoving at 300° C. for 1 minute, a coat of pleasant appearance having good adhesion, high electrical resistance and good corrosion resistance. After cooling and annealing in a mixture of hydrogen and nitrogen (5% hydrogen) for two hours at 800° C., the coat retained its adhesion, appearance and electrical resistance.

EXAMPLE 2

A hot solution of chromic acid (44.8 kg. of $CrO_3$) in water (99 litres) was reduced by the addition of oxalic acid (32.5 kg.) dissolved in water (82 litres) followed by boiling for 30 minutes. The resulting cooled solution had a pH of 1.85 and a ratio of soluble to total $CrO_3$ of 0.69:1. To the cool solution was added finely divided silica (6.8 kg.) followed by a solution of sodium hydroxide (50% w./w., 6.1 litres) to raise the pH of the solution to 2.55. Application of this solution to the surface of a silicon steel strip at a wet film thickness of $1.27 \times 10^{-2}$ mm. produced, after stoving at 300° C. for 1 minute, a coat of pleasant appearance having good adhesion, high electrical resistance and good corrosion resistance. After cooling and annealing in a mixture of hydrogen and nitrogen (5% hydrogen) for two hours at 800° C., the coat retained its adhesion, appearance and electrical resistance.

EXAMPLE 3

A solution of chromium trioxide (2.9 kg.) in water (10 litres) was reduced by wheat starch (0.23 kg.) added as a slurry in 2 litres of water as in Example 1. The ratio of $CrO_3$ to total chromium expressed as $CrO_3$ in the resulting solution was 0.75:1. After cooling finely divided silica (0.46 kg.) was added with vigorous stirring followed by potassium hydroxide solution (50% w./w.) to raise the pH to 2.1. It was found that, when this solution was applied to the surface of the steel strip at a wet film thickness of $1.15^3 \times 10^{-2}$ mm., it was necessary to stove for a period of 5 minutes at 300° C. in order to effect optimum curing. The cured coat had a pleasant appearance, good adhesion, high electrical resistance and a good corrosion resistance.

After cooling and annealing in a mixture of hydrogen and nitrogen (5% hydrogen) for 2 hours at 800° C. the coat retained its adhesion, appearance and electrical resistance.

EXAMPLE 4

A hot solution of chromic acid (44.8 kg. of $CrO_3$) in water (150 litres) was reduced by the addition of maize starch (3.80 kg. as a slurry in 30 litres of water) followed by boiling for 30 minutes. Analysis showed the resulting solution to have a pH of 1.8 and a ratio of soluble $CrO_3$ to total $CrO_3$ of 0.69:1. After cooling, a complex lithium magnesium fluorosilicate sold under the trade name Laponite S (6.5 kg.) was added slowly with vigorous stirring followed by potassium hydroxide (~4.25 litres of a 50% w./w. solution) to raise the pH of the final solution to 2.50. Application of this solution to the surface of a steel strip at a wet film thickness of $1.30 \times 10^{-2}$ mm. produced after stoving at 300° C. for 1 minute, a coat of pleasant appearance having good electrical resistance but somewhat inferior adhesion and corrosion resistance to a coat produced by a solution of similar specification using fume silica as a substrate for the complex fluorosilicate.

EXAMPLE 5

A solution of chromic acid (25% w./w.) was reduced by wheat starch added as a slurry at 100° C. to a ratio of hexavalent chromium to total chromium content (calculated as $CrO_3$) of 0.555:1. The solution was then diluted to five times its original volume with water, and silica (Aerosil) (1.5% w./v.) added. The pH of the solution at this stage was 2.8 and this was raised to 3.3 by the addition of KOH (50% w./w.) solution.

A coating of this solution was applied to one surface of some clean steel panels and cured by stoving for 90 seconds at 200° C. The weight of dried coating which had been applied was equivalent to 41 mg./sq. ft. An alkyd stoving enamel (thickness 0.0005″) was then applied to the treated side of the test panel and cured by stoving for 30 minutes at 120° C.

The panel was then subjected to corrosion tests in a salt spray cabinet. It was found that it showed virtually no corrosion after 500 hours whereas a control which had received the coat of stoving enamel but had not received the anti-corrosion treatment was completely corroded after 150 hours. Whilst the panel was still wet from immersion in the salt spray cabinet, a test showed that it had 100% adhesion whilst with the control no enamel adhesion remained.

EXAMPLE 6

The solution of partially reduced chromic acid prepared in Example 5 was diluted to six times its original volume with water and silica (3.3% w./v.) added. The pH of the solution was adjusted to 3.3 by addition of KOH as a 10% w./v. solution. The composition was applied to the surface of a clean steel test panel and cured by stoving for 20 seconds at 200° C. The treated panel was then placed in the salt spray corrosion cabinet and compared with the control panel consisting of a piece of untreated steel. It was found that after 22 hours the control had corrosion over most of the surface whilst the treated panel which had a coating weight equivalent to 45 mg./sq. ft. was corroded over only one-third of the surface.

EXAMPLE 7

A drum body was dipped into the composition as prepared in Example 6 and, after draining excess liquid, the coating was cured for 20 seconds at 200° C. The coating weight applied was equivalent to 60 mg./sq. ft. To the inside of the drum was applied by spray, a coating of epoxyphenolic lacquer to a thickness of approximately 0.0003″ which was then cured for 30 minutes at 177° C. Tests of the corrosion resistance of the outside of the drum showed that it corroded to the extent of two-thirds of its surface after 22 hours whereas an untreated control corroded over its entire surface in the same period.

EXAMPLE 8

The composition prepared in Example 5 was further diluted and applied to the surface of a clean galvanised steel panel to give a coating weight of 25 mg./sq. ft. after curing by stoving for 30 seconds at 200° C. On exposure to 100% relative humidity at 42–48° C. the first signs of white rust were visible after 600 hours whilst an untreated galvanised panel was completely covered with white rust after 50 hours. Paints which were applied to galvanised steel adhered well after exposure to salt spray and to humidity compared with the control; e.g. a white acrylic paint peeled off the controls after 1000 hrs. exposure whilst the treated panels were intact after 2000 hours.

EXAMPLE 9

A solution of chromic acid (200 g.) in water (750 ml.) was reduced by addition of a solution of dextrose (20 g.) in water (250 ml.) and boiling the mixture under reflux for 2 hours. The ratio of hexavalent chromium to total chromium content (calculated as $CrO_3$) was 0.592:1. The solution was then diluted to five times of its original concentration with water and silica (Aerosil 3.3% w./v.) added. The pH was then 2.8 and this was raised to 3.3 by the addition of 40 ml. of 10% w./v. sodium hydroxide. Similar tests to those described in Examples 5, 6, and 8 carried out and found to give equally good results.

EXAMPLE 10

A solution of chromic acid (200 g.) in water (750 ml.) was reduced by the addition of a slurry of wheat starch (22 g.) in water (250 ml.) at 100° C. to a ratio of hexavalent chromium to total chromium content (calculated as $CrO_3$) of 0.589:1. 200 ml. of water was then added before addition of 200 g. of silica and the adjustment to pH 2.5 by the addition of 75 ml. of 10% w./w. KOH. This composition was subsequently diluted by the addition of 4 times its volume of water and found to give equally good performance when subjected to the tests given in Examples 5–8.

EXAMPLE 11

Clean steel wire was coated with a composition prepared according to Example 9, stoved for 1 minute at 200° C. and coated with a PVC organosol paint which was then stoved for 30 minutes at 160° C. It was found that the plastic coating adhered better to this wire than to one which had not been treated and the spread of corrosion from a damaged part of the coating was reduced.

We claim:

1. An aqueous composition for providing metals with electrical and/or corrosion resistance having a pH of 2.0 to 4.0 and dissolved or uniformly dispersed therein: (a) a hexavalent chromium compound; (b) a trivalent chromium compound; (c) a soluble or insoluble colloidally dispersible silica and/or silicate in a total amount of at least 0.5 gram per 100 ml. of the composition; and (d) an alkali metal cation, the weight ratio of hexavalent chromium to total chromium (each determined on a $CrO_3$ basis) being between 0.5:1 and 0.75:1, the total chromium content being at least 0.5 g. chromium (calculated as $CrO_3$) per 100 ml. of the composition, and the weight ratio of hexavalent chromium (calculated as $CrO_3$) to alkali metal (calculated as the hydroxide) being between 5:1 and 100:1, the said aqueous composition being free from reducing agents for hexavalent chromium.

2. An aqueous composition for providing metals with corrosion resistance having a pH of 2.0 to 4.0 and dissolved or uniformly dispersed therein:
   (a) a hexavalent chromium compound;
   (b) a trivalent chromium compound;
   (c) a soluble or insoluble colloidally dispersible silica and/or a silicate in a total amount of 0.5–10 grams per 100 ml. of the composition; and
   (d) an alkali-metal cation, the weight ratio of hexavalent chromium to total chromium (each determined on a $CrO_3$ basis) being between 0.55:1 and 0.63:1, the total chromium content being at least 0.5 g. chromium (calculated as $CrO_3$) per 100 ml. of the composition, and the weight ratio of hexavalent chromium (calculated as $CrO_3$) to alkali metal (calculated as hydroxide) being between 5:1 and 100:1, the said aqueous composition being free from reducing agents for hexavalent chromium.

3. An aqueous composition for providing metals with electrical resistance having a pH of 2.0 to 4.0 and dissolved or uniformly dispersed therein:

(a) a hexavalent chromium compound;
(b) a trivalent chromium compound;
(c) a soluble or insoluble colloidally dispersible silica and/or a silicate in a total amount of 0.5–10 grams per 100 ml. of the composition; and
(d) an alkali metal cation, the weight ratio of hexavalent chromium to total chromium (each determined on a $CrO_3$ basis) being between 0.60:1 and 0.70:1, the total chromium content being 10–50 grams of chromium (calculated as $CrO_3$) per 100 ml. of the composition, and the weight ratio of hexavalent chromium (calculated as $CrO_3$) to alkali metal (calculated as hydroxide) being between 5:1 and 100:1, the said aqueous composition being free from reducing agents for hexavalent chromium.

4. An aqueous composition for providing metals with electrical and/or corrosion resistance having a pH of 2.0 to 4.0 consisting essentially of a solution or uniform dispersion of:

(a) a hexavalent chromium compound;
(b) a trivalent chromium compound;
(c) a soluble or insoluble colloidally dispersible silica and/or silicate in a total amount of at least 0.5 gram per 100 ml. of the composition; and
(d) an alkali metal cation, the weight ratio of hexavalent chromium to total chromium (each determined on a $CrO_3$ basis) being between 0.5:1 and 0.75:1, the total chromium content being at least 0.5 gram chromium (calculated as $CrO_3$) per 100 ml. of the composition, and the weight ratio of hexavalent chromium (calculated as $CrO_3$) to alkali metal (calculated as the hydroxide) being between 5:1 and 100:1, the said aqueous composition being free from reducing agents for hexavalent chromium.

5. The composition of claim 4 wherein said alkali metal is selected from the group consisting of sodium and potassium and wherein the total silica and silicate content is 2–4 g./100 ml. of the compostiion.

6. The composition of claim 5 wherein the component (c) is fume silica.

7. The composition of claim 6 having a pH of between 2.5 and 3.5.

8. An aqueous composition for providing metals with corrosion resistance having a pH of 2.0 to 4.0 consisting essentially of a solution or uniform dispersion of:

(a) a hexavalent chromium compound;
(b) a trivalent chromium compound;
(c) a soluble or insoluble colloidally dispersible silica and/or a silicate in a total amount of 0.5–10 grams per 100 ml. of the composition; and
(d) an alkali-metal cation selected from the group consisting of sodium and potassium, the weight ratio of hexavalent chromium to total chromium (each determined on a $CrO_3$ basis) being between 0.55:1 and 0.63:1, the total chromium content being at least 0.5 g. chromium (calculated as $CrO_3$) per 100 ml. of the composition, and the weight ratio of hexavalent chromium (calculated as $CrO_3$) to alkali metal (calculated as hydroxide) being between 5:1 and 100:1.

9. The composition of claim 8 wherein the component (c) is insoluble and wherein the total silica and silicate content is 2–4 g./100 ml. of the composition, wherein the total chromium content (calculated as $CrO_3$) is 3–10 g./100 ml. of the composition.

10. The composition of claim 9 having a pH of between 2.5 and 3.5.

11. The composition of claim 10 wherein said alkali metal cation is potassium.

12. A method of rendering a surface of iron, steel, aluminum, magnesium, zinc or alloys thereof corrosion resistant which comprises coating the said metal with a composition as claimed in claim 9 and thereafter curing the coating whereafter its hexavalent chromium content is substantially water-insoluble.

13. An aqueous composition for providing metals with electrical resistance having a pH of 2.0 to 4.0 consisting essentially of a solution or uniform dispersion of:

(a) a hexavalent chromium compound;
(b) a trivalent chromium compound;
(c) a soluble or insoluble colloidally dispersible silica and/or a silicate in a total amount of 0.5–10 grams per 100 ml. of the composition; and
(d) an alkali metal cation selected from the group consisting of sodium and potassium, the weight ratio of hexavalent chromium to total chromium (each determined on a $CrO_3$ basis) being between 0.60:1 and 0.70:1, the total chromium content being 10–50 grams of chromium (calculated as $CrO_3$) per 100 ml. of the composition, and the weight ratio of hexavalent chromium (calculated as $CrO_3$) to alkali metal (calculated as hydroxide) being between 5:1 and 100:1.

14. A composition as claimed in claim 13 wherein the component (c) is insoluble, wherein the total silica and silicate content is 3–10 g./100 ml. of the composition, and wherein said total chromium content (calculated as $CrO_3$) is 20–30 g./100 ml. of the composition.

15. The composition of claim 14 wherein the component (c) is fume silica.

16. The composition of claim 15 which has a pH of between 2.5 and 3.5.

17. The composition of claim 16 wherein said alkali metal cations is potassium.

18. A method of rendering a surface of silicon steel electrically resistant which comprises treating the said silicon steel with a composition as claimed in claim 13 and thereafter curing the coating by heating to at least 250° C. whereafter its hexavalent chromium content is substantially water-insoluble.

References Cited

UNITED STATES PATENTS

| | | | |
|---|---|---|---|
| 3,421,949 | 1/1969 | Halversen | 148—6.2 |
| 3,451,865 | 1/1969 | Bretz | 148—6.2 |
| 3,404,046 | 10/1968 | Russell et al. | 148—6.2 |
| 3,298,876 | 1/1967 | Beckwith et al. | 148—6.2 |
| 3,556,869 | 1/1971 | Okada et al. | 148—6.2 |
| 3,506,499 | 4/1970 | Okada et al. | 148—6.2 |
| 3,053,702 | 9/1962 | Schuster et al. | 148—6.2 |

DANIEL J. FRITSCH, Primary Examiner

U.S. Cl. X.R.

117—135.1, 224, 230; 252—63, 63.5, 387

UNITED STATES PATENT OFFICE
CERTIFICATE OF CORRECTION

Patent No. 3,706,603              Dated December 19, 1972

Inventor(s) CLIFFORD A. VESSEY et al

It is certified that error appears in the above-identified patent and that said Letters Patent are hereby corrected as shown below:

In Column 1, line 10, the words "Continuation-in-part" should be --Continuation--.

In Column 10, line 48, the word "cations" should be --cation--.

Signed and sealed this 17th day of April 1973.

(SEAL)
Attest:

EDWARD M. FLETCHER, JR.                ROBERT GOTTSCHALK
Attesting Officer                      Commissioner of Patents